US011528285B2

(12) United States Patent
Achleitner

(10) Patent No.: US 11,528,285 B2
(45) Date of Patent: Dec. 13, 2022

(54) LABEL GUIDED UNSUPERVISED LEARNING BASED NETWORK-LEVEL APPLICATION SIGNATURE GENERATION

(71) Applicant: Palo Alto Networks, Inc., Santa Clara, CA (US)

(72) Inventor: Stefan Achleitner, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 297 days.

(21) Appl. No.: 16/716,235

(22) Filed: Dec. 16, 2019

(65) Prior Publication Data

US 2021/0185059 A1 Jun. 17, 2021

(51) Int. Cl.

*H04L 9/40* (2022.01)
*H04L 43/026* (2022.01)
*G06F 16/35* (2019.01)

(52) U.S. Cl.

CPC ........ *H04L 63/1416* (2013.01); *G06F 16/355* (2019.01); *H04L 43/026* (2013.01); *H04L 63/0227* (2013.01); *H04L 63/1425* (2013.01)

(58) Field of Classification Search

CPC ............... H04L 63/1416; H04L 43/026; H04L 63/0227; H04L 63/1425; G06F 16/355
See application file for complete search history.

(56) References Cited

U.S. PATENT DOCUMENTS

| | | | | |
|---|---|---|---|---|
| 6,397,166 | B1 * | 5/2002 | Leung | G06F 17/18 702/179 |
| 9,086,499 | B2 * | 7/2015 | Medeiros | H04L 67/125 |
| 9,094,288 | B1 * | 7/2015 | Nucci | H04L 43/026 |
| 9,336,484 | B1 * | 5/2016 | Iverson | G06F 17/18 |
| 10,332,005 | B1 * | 6/2019 | Liao | G06N 5/00 |
| 10,623,429 | B1 * | 4/2020 | Vines | H04L 41/14 |
| 2011/0202528 | A1 * | 8/2011 | Deolalikar | G06F 16/355 707/737 |

(Continued)

OTHER PUBLICATIONS

41. G. Gu, R. Perdisci, J. Zhang, and W. Lee, "Botminer: Clustering analysis of network traffic for protocol- and structure-independent botnet detection," in Proc. of 17th USENIX Security Symposium (USENIX Security '08), Jun. 2008, pp. 139-154: multi step clustering. (Year: 2008).*

(Continued)

*Primary Examiner* — Catherine Thiaw
(74) *Attorney, Agent, or Firm* — Gilliam IP PLLC

(57) ABSTRACT

Application-initiated network traffic is intercepted and analyzed by an application firewall in order to identify streams of traffic for a target application. An application signature generator preprocesses the raw data packets from the intercepted network traffic by tokenizing the data packets and then weighting each token according to its importance for application identification. The weighted features for each data packet are clustered using an unsupervised learning model, and the resulting clusters are iteratively refined and re-clustered using a proximity score between the clusters and feature vectors for key tokens for the target application. The application signature generator generates a signature for the clusters corresponding to the target application which the application firewall implements for filtering network traffic.

27 Claims, 5 Drawing Sheets

(56) References Cited

U.S. PATENT DOCUMENTS

| | | | | |
|---|---|---|---|---|
| 2014/0143407 | A1* | 5/2014 | Zhang | H04L 67/00 709/224 |
| 2017/0053214 | A1* | 2/2017 | Bellala | G06K 9/6223 |
| 2017/0124478 | A1* | 5/2017 | Baradaran | H04L 63/1425 |
| 2017/0316342 | A1* | 11/2017 | Franc | G06N 20/10 |
| 2020/0036734 | A1* | 1/2020 | Radja | H04L 63/0227 |
| 2020/0175041 | A1* | 6/2020 | Ramachandra Iyer | G06F 16/24578 |
| 2020/0356994 | A1* | 11/2020 | Rao | H04L 63/102 |
| 2020/0404009 | A1* | 12/2020 | Shinomiya | H04L 43/0876 |
| 2021/0004638 | A1* | 1/2021 | Meng | G06F 16/285 |

OTHER PUBLICATIONS

Dai, et al., "NetworkProfiler: Towards Automatic Fingerprinting of Android Apps", 2013 Proceedings IEEE INFOCOM, 9 pages.

Perdisci, et al., "Behavioral Clustering of HTTP-Based Malware and Signature Generation Using Malicious Network Traces", Proceedings of the 7th USENIX Conference on Networked Systems Design and Implementation, NSDI'10, 14 pages.

Tharp, et al., "Improving Signature Quality For Network Application Identification", Digital Communications and Networks. 5. https://doi.org/10.1016/j.dcan.2018.10.010, 8 pages.

* cited by examiner

LABEL GUIDED UNSUPERVISED LEARNING BASED NETWORK-LEVEL APPLICATION SIGNATURE GENERATION

BACKGROUND

The disclosure generally relates to information security and packet filtering.

Software as a service (SaaS) based applications running on a network generate traffic from many third-party services such as content delivery networks, file transfer services, and analytics tools in addition to the core application traffic. Traffic from these applications can be filtered via an application firewall that monitors data packets throughout the network using network-level application signatures, i.e., patterns discovered from packets that represent network behavior of applications.

BRIEF DESCRIPTION OF THE DRAWINGS

Aspects of the disclosure may be better understood by referencing the accompanying drawings.

DESCRIPTION

Figure 1:
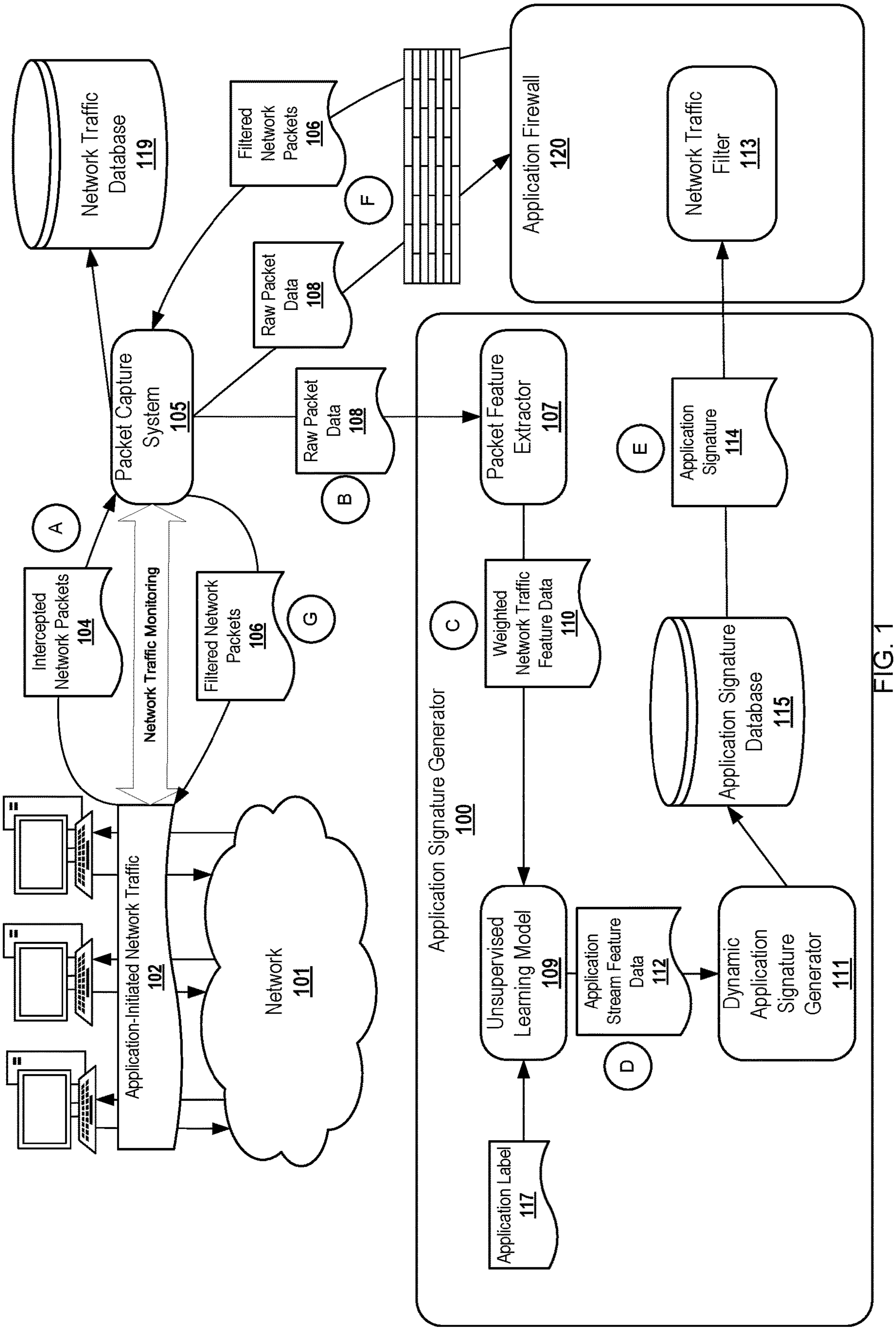
FIG. 1 is a schematic diagram of network signature generation to identify applications based on network traffic.

The description that follows includes example systems, methods, techniques, and program flows that embody aspects of the disclosure. However, it is understood that this disclosure may be practiced without these specific details. For instance, this disclosure refers to network-level application signature generation using clustering in illustrative examples. Aspects of this disclosure can be instead applied to network traffic of applications using other unsupervised learning algorithms. In other instances, well-known instruction instances, protocols, structures and techniques have not been shown in detail in order not to obfuscate the description.

Overview

A network-level application signature is a pattern(s) in network traffic of an application that is representative of network behavior of the application. The pattern can be a string pattern, byte pattern, hexadecimal pattern, etc. Generating network-level application signatures for software as a service (SaaS) based (and non-SaaS based) applications depends on the applications' core and third-party traffic on a network. In order to more effectively model this traffic, feature vectors derived from data packets sampled from network traffic monitored by an application firewall are processed as input to an unsupervised learning model. The unsupervised learning model generates successive refinements of clusters of the feature vectors that are strongly associated with a descriptive or identifying label for an application (e.g., application name, application class, etc.). The resulting refined feature vector cluster(s) for the application corresponding to the application label is used to automatically generate a dynamic network-level application signature (hereinafter "dynamic application signature") to be deployed by the application firewall.

More concretely, unlabeled data packets are aggregated from the network by a packet analyzer and forwarded to an application signature generator. The application signature generator comprises a feature extractor that, for each data packet, tokenizes the data packet and generates a weighted numerical feature vector based on the tokenization. The weights for each token are assigned based on which fields in the data packet the tokens originated from, using a table of known importance values for each data packet field for indicating application traffic. Weighted numerical feature vectors for each data packet are used as input to the unsupervised learning model.

The unsupervised learning model generates a predetermined number of clusters of weighted numerical feature vectors. The tokens corresponding to feature weights for the centers of each of these clusters are verified against the application label, and a cluster identification weight is assigned based on the magnitude of weights for features indicating the application label. Using these cluster identification weights the clusters are filtered if below a threshold identification weight. The unsupervised learning model generates a new set of clusters using the unfiltered cluster centers as initializations. This process iterates until a termination criterion is satisfied (e.g., below a desired proximity score to an application label) for a refined set of cluster(s). The refined cluster(s) are used to a generate a "dynamic application signature" based on patterns in one or more packets of a stream or session as represented by the refined cluster(s) of feature vectors. Since a network behavior pattern for an application may vary across different contexts (e.g., type of application request, location of a pattern within a packet, etc.), finding an effective, static application signature would at least be challenging. Instead, the "dynamic application signature" captures a signature of an application that can vary across different contexts including across different packets of an application session. The dynamic application signature is program code that searches for a variable pattern or different patterns that identify an application depending upon the captured network traffic. This pipeline for automatic signature generation is faster and less error prone than manual signature generation using expert domain knowledge.

Example Illustrations

FIG. 1 is a schematic diagram of network signature generation to identify applications based on network traffic. In contrast to an emulation or experiment, the application firewall is monitoring network traffic that has protocol data units (hereinafter "packets" regardless of protocol) for multiple, different applications. Application-initiated network traffic 102 over a network 101 is monitored by a packet capture system 105 that intercepts and logs application-initiated network traffic 102 in a network traffic database 119. The packet capture system 105 further forwards raw packet data 108 to an application signature generator 100 for application signature generation and an application firewall 120 for application-based network traffic filtering. The packet capture system 105 can capture packets for an individual stream or multiple streams and send captured packets or raw packet data organized by stream to the application signature generator 100. A packet feature extractor 107 running on the application signature generator 100 receives the raw packet data 108 and generates weighted network traffic feature data 110 which the packet feature extractor 107 sends to an unsupervised learning model 109. The unsupervised learning model 109 iteratively generates clusters of the weighted network traffic feature data and evaluates them against an application label 117 to generate stream-based application feature vectors 112. A dynamic application signature generator 111 receives the stream-based application feature vectors 112 and generates a variable or dynamic signature for the corresponding application which it stores in an application signature database 115. A network traffic filter 113 of an application firewall 120 can then use the dynamic signatures of the application signature database 115 to filter network traffic.

In parallel or as a separate data pipeline to the above signature generation, the application firewall 120 evaluates network traffic against previously generated applications signatures corresponding to applications deemed malicious or not allowed. The packet capture system 105 sends raw packet data 108 to the application firewall 120, which evaluates the raw packet data 108 against application signatures using the network traffic filter 113, which removes data packets corresponding to the application signatures. The application firewall 120 then sends filtered network packets 106 to the packet capture system 105, which forwards the filtered network packets 106 back onto the network 101.

FIG. 1 is annotated with a series of letters A-G. These letters represent stages of operations. Although these stages are ordered for this example, the stages illustrate one example to aid in understanding this disclosure and should not be used to limit the claims. Subject matter falling within the scope of the claims can vary with respect to the order and some of the operations. Although stages B, C, D, E, and F are represented in alphabetical order in FIG. 1, the data pipeline from stages B to E and the data pipeline at stage F are separate and these operations can be performed in parallel, sequentially, or in some cases stages B to E may not be performed.

At stage A, the packet capture system 105 intercepts and logs the intercepted network packets 104 from the application-initiated network traffic 102 over the network 101. The network 101 can be a local area network (LAN) or wide area network (WAN). The application-initiated network traffic 102 can comprise internal communications inside a LAN or external communications between a LAN and a WAN. The packet capture system 105 can monitor all data packets over the network 101 or can monitor a subset of data packets. The packet capture system 105 can collect data packets from an individual stream or from multiple streams (e.g., transmission control protocol (TCP) sessions). The packet capture system 105 can further use an application programming interface (API) such as pcap for packet capture and to generate data packet logs that are stored in the network traffic database 119 for future application traffic analysis. Although depicted as separate from the application firewall 120, the packet capture system 105 can be running on the application firewall 120.

At stage B, the packet capture system 105 forwards raw packet data 108 for the application-initiated network traffic 102 monitored at stage A to the application signature generator 100. The packet capture system 105 can capture packets and discriminate between streams in monitored network traffic according to different techniques and can forward the raw packet data 108 according to different techniques to the application signature generator 100. The packet capture system 105 can capture packets of an individual stream then then forward the raw packet data for that individual stream for signature generation. Embodiments can implement the packet capture system 105 to capture packets of multiple streams (e.g., maintain separate captured packet queues per stream) and then forward the raw packet data of the multiple streams individually upon a release or forward trigger (e.g., the stream is terminated or a specified number of packets have been captured). Embodiments can implement the signature generator 100 with functionality to differentiate captured packets by stream (e.g., based on session information or endpoint information communicated from the packet capture system 105) and generate signatures per stream. This protocol for packet capture can also occur at stage F when the application firewall 120 analyzes network traffic.

The raw packet data 108 comprises data packets having a header and a payload. The header specifies metadata about the data packet such as Hypertext Transfer Protocol (HTTP) header fields that specify properties of a data packet sender, a data packet recipient, a type of payload, parameters of the payload, etc. The payload comprises the intended message contained in the data packet. For instance, for HTTP data packets, the payload can comprise Hypertext Markup Language (HTML) code, JavaScript® code, Cascading Style Sheets (CSS) code, etc. as specified in the header. Data packets sent internally over a LAN can contain machine identifiers or other local machine data in the header. For data packets originating from a TCP session, the headers can comprise information about the TCP session.

At stage C, the packet feature extractor 107 extracts weighted network traffic feature data 110 from the raw packet data 108 and sends the weighted network traffic feature data 110 to the unsupervised learning model 109. The weighted network traffic feature data 110 comprises numerical vectors with entries corresponding to tokens found in the raw packet data 108 and weights corresponding to importance of data packet fields from which the tokens were derived. For example, based on aggregated network data for other applications, a HTTP request host header field (e.g. 'www.example.com') for data packets can show a strong correlation for predicting an application running the data packets. In this case, a token ('example') can have a larger weight because it originated from the HTTP request host header fields in the raw packet data 108. Because the weighted network traffic feature data 110 contains long vectors that have a number for every token extracted from the raw packet data 108, these vectors can comprise mostly zero entries.

At stage D, the unsupervised learning model 109 receives the weighted network traffic feature data 110 and uses it as input to generate weighted packet feature clusters. The unsupervised learning model 109 evaluates the weighted packet feature clusters using an application label and eliminates clusters that don't relate to a target application for signature generation. The remaining clusters are refined (i.e. via another clustering step) and this process iterates until a termination criterion is satisfied—e.g., single weighted packet feature cluster remains. This weighted packet feature cluster corresponds to an isolated application data stream that the unsupervised learning model 109 adds to the application stream feature data 112 which it sends to the dynamic application signature generator 111. The application stream feature data 112 can be weighted numerical vectors or can be tokenized data packets. The packet feature extractor 107 can embed raw packet data along with the corresponding weighted feature vectors in the weighted network traffic feature data 110 and the unsupervised learning model 109 can access this raw packet data to forward to the dynamic application signature generator 111.

Using tokenized data packets in the application stream feature data 112, the dynamic application signature generator 111 creates a signature for each application data stream represented in the application stream feature data 112, assuming that the unsupervised learning model 109 has aggregated output from inputs corresponding to different streams. The dynamic signature generator 111 uses a set of rules that verify whether substrings of a prescribed format are present in data packet fields. For example, the dynamic signature generator 111 can be xml code that checks the data packets against a set of strings to verify if a subset of the set of strings and/or all of the set of strings are present in the data packets. Signature generation can occur automatically by identifying common strings in the application stream feature data 112 and generating conditional xml statements that search for these strings. Before being added to the application signature database 115, signatures generated by the dynamic application signature generator 111 can be unit tested against data streams originating from the signatured application and data streams originating from different applications to test for false positives and false negatives.

Pseudocode for an example dynamic signature generated by the dynamic application signature generator 111 can be the following:

```
<and>
    <entry>
        <pattern-match>
            <ignore-case>no</ignore-case>
            <pattern>upload\.wikimedia\.org\r\n</pattern>
            <context>http-req-host-header</context>
        </pattern-match>
    </entry>
    <entry>
        <pattern-match>
            <ignore-case>no</ignore-case>
            <pattern>en\.wikipedia\.org</pattern>
            <context>http-req-referer-header</context>
        </pattern-match>
    </entry>
    <entry>
        <pattern-match>
            <ignore-case>no</ignore-case>
            <pattern> wikipedia </pattern>
            <context>http-req-uri-path</context>
        </pattern-match>
    </entry>
</and>
```

In this example, the dynamic signature causes a process interpreting the dynamic signature to examine captured network traffic of a session or stream for the three specified patterns (as denoted by the <and> logical), each pattern corresponding to a regular expression in an http header field.

At stage E, the application signature database 115 forwards the generated application signature 114 to the network traffic filter 113 running on the application firewall 120. The application firewall 120 can query the application signature database 115 for application signatures based on a security policy for the application firewall 120. This security policy can be based on known malicious applications for the network 101, user input applications, etc. The policy can be dynamically updated and the application firewall 120 can query the application signature database 115 as potentially malicious applications are detected.

At stage F, the packet capture system 105 sends incoming raw packet data 108 from one or more streams to the application firewall 120. The application firewall 120 verifies the raw packet data 108 for each stream against application signatures stored on the network traffic filter 113 and discards raw data packets (or isolates them for forensic analysis, for example) and flags or terminates the stream(s) corresponding to the packet or packets that have a positive match against the application signatures. For example, using the aforementioned application signature a stream having the following three packets would match a signature pattern: a first data packet with a http request host field having a value of 'upload.wikimedia.org', a second data packet with a http request referrer header field with a value of 'https://en.wikipedia.org/wiki/Main_Page', and a third data packet with http request URI path header field with a value that includes "wikipedia". Alternatively, a single data packet could comprise all of the aforementioned fields, or the fields could be spread across data packets in any combination. Once filtered, the application firewall 120 sends the filtered network packets 106 to the packet capture system 105.

At stage G, the packet capture system 105 inserts the filtered network packets 106 back into the application-initiated network traffic 102 running on the network 101. The packet capture system 105 can store a record of destination nodes for data packets in the network 101 based on the endpoints for a corresponding stream comprising the data packets or can store identifiers for these destination nodes in the data packets. When the packet capture system 105 inserts the data packets back into the network 101, it can access this record of destination nodes and can forward the data packets to their respective destination nodes.

Figure 2:
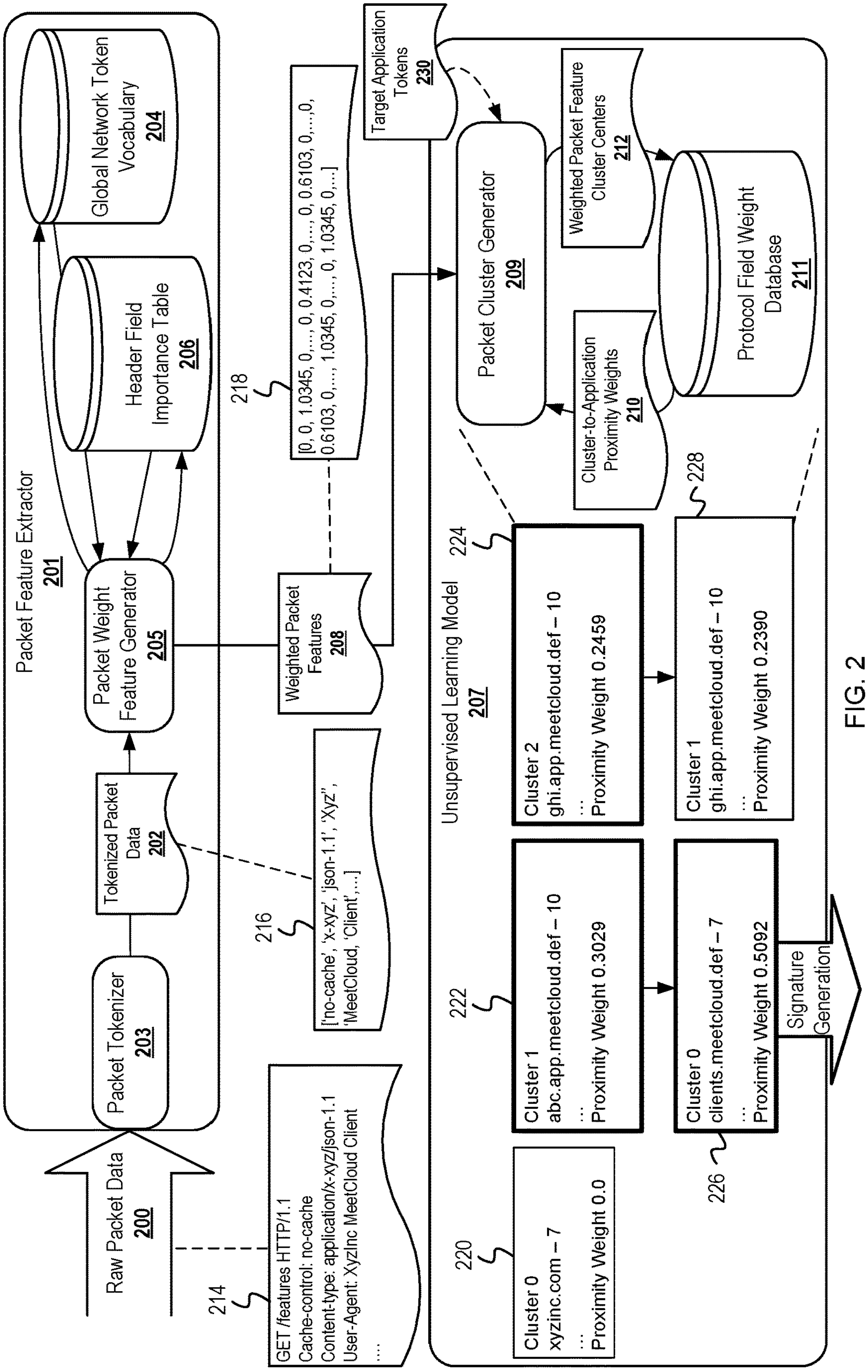
FIG. 2 is a schematic diagram of a data pipeline for extracting application data from raw packet data.

FIG. 2 is a schematic diagram of a data pipeline for determining application stream feature data from raw packet data to generate an application signature. A packet feature extractor 201 comprises a packet tokenizer 203 and a packet weight feature generator 205. The packet feature extractor 201 receives raw packet data 200 (exemplified by data 214) and sends it to the packet tokenizer 203. The packet tokenizer 203 parses the raw packet data 200 to extract tokens to form tokenized packet data 202 exemplified by data 216 that the tokenizer 203 sends to the packet weight feature generator 205. The packet weight feature generator 205 accesses and updates a global network token vocabulary 204 and a header field importance table 206 in order to generate weighted packet features 208 exemplified by data 218.

An unsupervised learning model 207, which comprises a packet cluster generator 209, receives the weighted packet features. The packet cluster generator 209 generates weighted packet feature cluster centers 212 which it sends to a protocol field weight database 211. The unsupervised learning model 207 receives target application tokens 230 and evaluates the weighted packet feature cluster centers 212 against the target application tokens 230 using the protocol field weight database 211 to generate cluster-to-application proximity weights 210. Using the cluster-to-application proximity weights 210, the packet cluster generator 209 eliminates a subset of weighted packet feature clusters that do not resemble application labels and re-clusters the weighted packet features 208. This process occurs iteratively until a single weighted packet feature cluster remains.

The example packet data 214 comprises an HTTP 1.1 GET request with a cache-control header field of no-cache, a content-type of application/x-xyz/json-1.1, and a user-agent of XyzInc MeetCloud Client. Although not depicted, the example packet data 214 further comprises HTTP response header fields and a packet payload containing an HTTP response message. The packet tokenizer 203 can parse the raw packet data 200 to remove known header field prefixes (e.g., 'Cache-control,' 'Content-type,' and 'User-Agent' from example packet data 214) as well as common delimiters such as '/', ':', ';', etc. in order to extract tokens. The resulting tokenized packet data 202 contains descriptive tokens that describe attributes of the data packet. For example, the example tokenized packet data 216 derived from the example packet data 214 is a vector of strings containing 'no-cache,' 'x-xyz,' 'json-1.1,' 'XyzInc,' 'MeetCloud,' 'Client,' etc. The tokenized packet data 202 can further comprise known header field prefixes removed from the raw packet data 200 in the above, and these known header field prefixes can be associated with the tokens in memory (e.g., 'no-cache' is associated with 'Cache-control').

The packet weight feature generator 205 receives the tokenized packet data 202 and generates weights for each token in the tokenized packet data. The packet weight feature generator 205 queries the header field importance table 206 with a vector of header field prefixes for each token in the tokenized packet data (e.g., ['Cache-control', 'Content-type', 'User-Agent', . . . ]). The header field importance table 206 returns a vector of header field importance values for each header field prefix, according to existing dynamic application signatures. These header field importance values are determined prior to deployment of the system in FIG. 2 and can be determined, for example, by associating (either by hand or automatically) tokens in known dynamic application signatures with header field prefixes, and determining importance of each header field prefix by the frequency with which it appears in the dynamic application signatures.

Subsequently, the packet weight feature generator 205 queries the global network token vocabulary 204 with a vector of tokens (e.g., the tokenized packet data 216) and receives a vector of token importance values. The token importance values can be, for example, a term-frequency inverse document-frequency (tf-idf) statistic for tokens in existing dynamic application signatures. The packet weight feature generator 205 orders the tokens in the tokenized packet data 202 according to this statistic and generates a vector of weighted packet features 208 by initializing a vector of all zeroes for each token, and then populating it with header field importance values for header field prefixes of tokens present in the tokenized packet data 202. For example, the weighted packet feature data 218 comprises a feature vector [0, 0, 1.0345, 0, . . . , 0, 0.4123, 0, . . . , 0, 0.6103, 0, . . . , 0, 0.6103, 0, . . . , 1.0345, 0, . . . , 0, 1.0345, 0, . . . ]. In this example, the 'Client' token has a highest tf-idf statistic value of the tokens in the tokenized packet data 202 and the header field importance value for the corresponding User-Agent header field for the 'Client' token is 1.0345. The next highest tf-idf statistic values are for the 'no-cache', 'json-1.1', 'x-xyz', 'XyzInc, and 'MeetCloud' tokens with header field importance values of 0.412, 0.6103, 0.6103, 1.0345, and 1.0345 respectively. In this example, most of the entries in the weighted packet feature data 218 are zero because most of the tokens in the global network token vocabulary 204 are not present in the tokenized packet data 202. The packet weight feature generator 205 sends the generated weighted packet features 208 to the unsupervised learning model 207.

The header field importance table 206 and the global network token vocabulary 204 can be maintained independently from the packet processing operations depicted in FIG. 2. As dynamic application signatures are added to an application firewall system (not pictured) running the packet feature extractor 201 and the unsupervised learning model 207, the header field importance table 206 and global network token vocabulary 204 can be updated according to header fields and tokens, respectively, found in the dynamic application signatures.

The packet cluster generator 209 in the unsupervised learning model 207 receives the weight packet features 208 and generates weighted packet feature clusters iteratively in communication with a protocol field weight database 211. The packet cluster generator 209 generates weighted packet feature clusters using an unsupervised learning algorithm. For example, the packet cluster generator 209 can run k-means clustering on the weighted packet features 208 for a predetermined value of k that can be optimized based on the statistics of the raw packet data 200 and corresponding weighted packet features 208. The weighted packet features 208 can be clustered for varying values of k and the cost of the final clustering (i.e., the sum of distances from each clustered weighted packet feature to its cluster center) can be plotted. This plot can display an elbow shape, and k can be chosen at the tip of this elbow shape. The packet cluster generator 209 aggregates cluster centers for the clustering generated by the unsupervised learning algorithm into the weighted packet feature cluster centers 212.

The protocol field weight database 211 comprises a database of weights for protocol fields according to their importance for application identification. These weights can be determined based on protocol fields in data packets for traffic from known applications. The protocol field weight database 211 receives the weighted packet feature cluster centers 212 and retrieves tokens for the non-zero values in the weighted packet feature cluster centers 212 (e.g., using an internal index of token to entry pairs, or by querying the global network token vocabulary). For each cluster, the unsupervised learning model 207 uses the protocol field weight database 211 to verify the retrieved tokens and their token weights against application tokens 230 for a target application for which a signature is to be generated. The target application may an application that has been identified for blocking by an application firewall. For example, a security policy of an application firewall system in communication with the packet feature extractor 201 and the unsupervised learning model 207 specifies one or more applications not permitted to be used in an organization via the target application tokens 230. The unsupervised learning model 207 match these tokens by literal string or substring matching, or by fuzzy matching. Each cluster is given a proximity weight to the target application based on this token matching and weights from the protocol field weight database given to each token, and these proximity weights are aggregated into the cluster-to-application proximity weights 210. Based on the cluster-to-application proximity weights, the packet cluster generator 209 discards a subset of the clusters generated above. For instance, the packet cluster generator 209 can discard all clusters with a cluster-to-application proximity weight below a desired threshold. This desired threshold can be determined by running the unsupervised learning model 207 on weighted packet features 208 from a known application (or several applications over several iterations) and recording the lowest cluster-to-application proximity weights 210. In some embodiments, if the packet cluster generator 209 finds no clusters above the threshold-to-application proximity weight, operations can terminate.

For the remaining clusters, the packet cluster generator 209 performs a re-clustering. For example, for k-means clustering the packet cluster generator 209 can initialize cluster centers where they terminated after the last k-means run and can re-cluster all the points in clusters that were not filtered by the cluster-to-application proximity weights 210 starting with these cluster centers. The k-means algorithm can be altered to only take points within a threshold distance of cluster centers so as to not capture traffic irrelevant to the desired application 230. The packet cluster generator 209 iteratively generates clusters and proximity weights in communication with the protocol field weight database 211 until a set of clusters with proximity weights above a desired threshold remains. The packet cluster generator 209 sends this single "refined" cluster to a dynamic signature generator (not pictured).

To exemplify, example clusters 220, 222, 224 are generated by the packet cluster generator 209 at a first pass of the weighted packet features 208. The protocol field weight database 211 gives higher weights to clusters 222 and 224 which are re-clustered by the packet cluster generator 209, resulting in clusters 226 and 228. The protocol field weight database 211 gives a higher weight to cluster 226 which is forwarded for signature generation. In this example, the desired application 230 is XyzInc MeetCloud. Each cluster in the clusters 220, 222, 224, 226, and 228 is labeled with a host identifier (i.e. URL) with a corresponding number that indicates the number of TCP sessions originating from that host identifier occurred for data packets in the respective cluster. For example, the data packets in cluster 0 originated from seven TCP sessions from a host 'fls-na.xyzinc.com' (among other host identifiers not depicted) and has a proximity weight of 0.0 from the protocol field weight database 211 because none of the data packets in cluster 220 related to keywords for XyzInc MeetCloud. The clusters 220, 222, 224, 226, and 228 have proximity weights 0.0, 0.3029, 0.2459, 0.5092, 0.2390 respectively, and data packets in the clusters originated from host identifiers 'xyzinc.com' with 7 TCP sessions, 'abc.app.meetcloud.def' with 10 TCP sessions, 'ghi.app.meetcloud.def' with 10 TCP sessions, 'clients.meetcloud.def' with 7 TCP sessions, and 'ghi.app.meetcloud.def' with 10 TCP sessions respectively.

Although depicted for unencrypted data in various examples above, the raw packet data 200 can be data from an encrypted data stream e.g. from a TLS session. In this embodiment, the pipeline of data through the packet feature extractor 201 to the unsupervised learning model 207 is substantially the same, with interpretable tokenized packet data 202 being replaced by data from the unencrypted parts of the encrypted data packets, for example the data from a TLS handshake. Dynamic application signatures based on the cluster 226 therefore comprise patterns in these unencrypted data parts.

Figure 3:
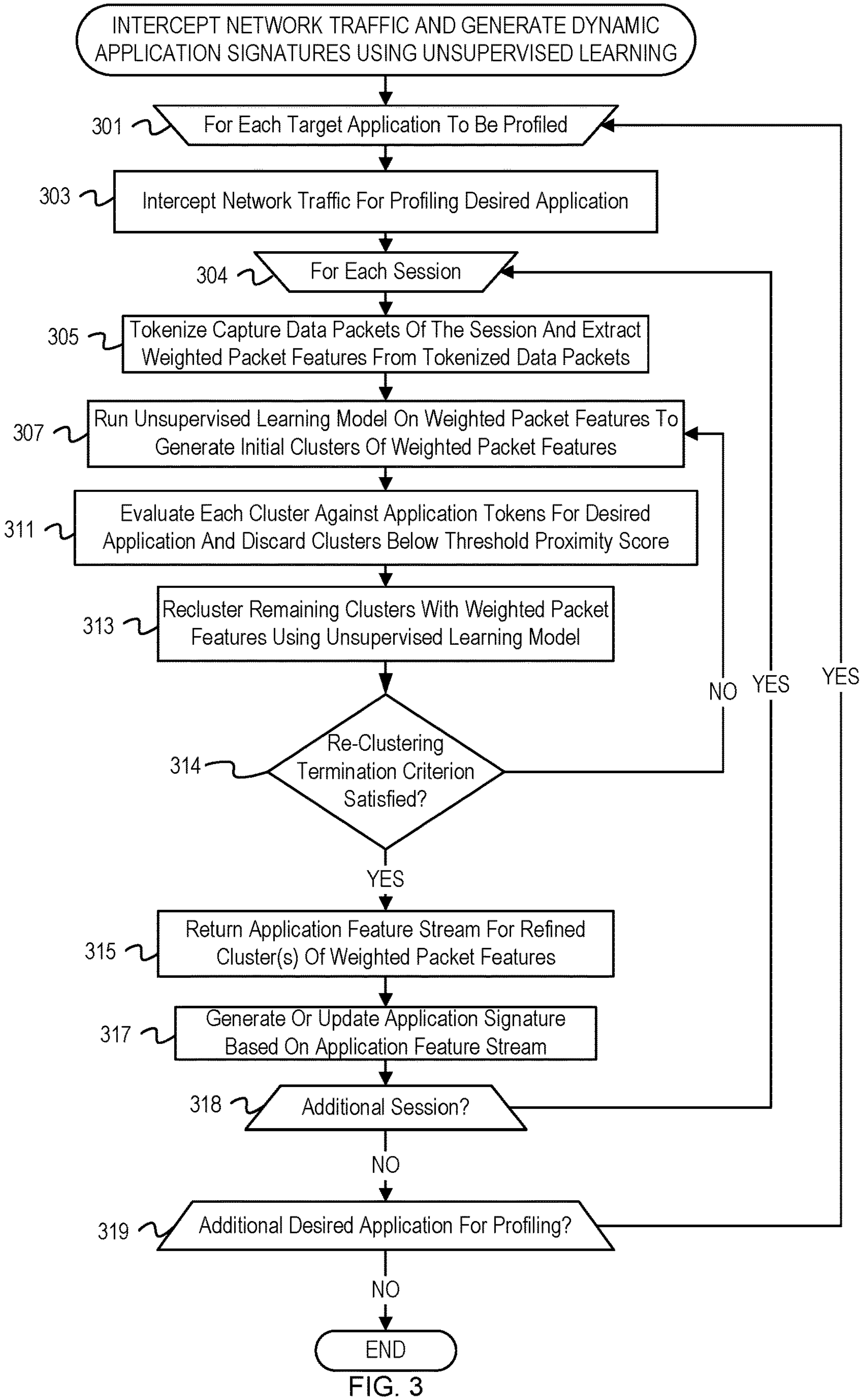
FIG. 3 is a flowchart of example operations for intercepting network traffic and generating dynamic application signatures using unsupervised learning.

FIG. 3 is a flowchart of example operations for intercepting network traffic and generating dynamic application signatures using unsupervised learning. The example operations are described with reference to an application firewall and an application signature generator for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 301 the application firewall begins iterating over target applications to be profiled. Although the subsequent operations at blocks 303, 305, 307, 311, 313, 314 and 315 are depicted in sequence, these operations can run in parallel across profiling multiple applications as data is intercepted by the application firewall. The target applications can be applications that have not been profiled, applications from which intercepted traffic is expected to originate based on domain knowledge, etc.

At block 303, the application firewall intercepts network traffic for profiling the target application. The application firewall can intercept traffic one session at a time or intercept traffic from multiple sessions. For instance, the application firewall can select a set of logical sockets and intercept traffic of the selected sockets. The application firewall can scan ports or sockets for active sessions and intercept or sample packets from a specified number of the active sessions (or all of them).

At block 304, the application signature generator begins iterating over each session based, captured network traffic for signature generation. The application firewall may continue capturing network traffic for a first session (e.g., first TCP session) while the application signature generator processes captured packets of a second session. This increases likelihood of detecting patterns in different contexts for an application. The session of captured network traffic being processed in an iteration is referred to as the "source session."

At block 305, the application signature generator tokenizes captured data packets of the source session of network traffic and extracts weighted packet features from the tokenized data packets. The tokenization and feature extraction steps in block 305 can occur as described with reference to FIG. 2.

At block 307, the application signature generator runs an unsupervised learning model on the weighted packet features extracted at block 305 and generates initial clusters of weighted packet features. These initial clusters can be generated by any unsupervised learning algorithm for clustering as described variously above. The weighted packet features can be preprocessed as part of the unsupervised learning model so that they are more amenable to clustering, using known data preprocessing algorithms (e.g., density-based spatial clustering) or known domain knowledge of the structure of the weighted packet features. The number of clusters can be chosen by generating clusters using the unsupervised learning model for varying numbers of clusters and measuring the accuracy of the resulting clusters for application identification. This step can occur prior to the operations in FIG. 3 using traffic from known applications to find the optimal number of clusters.

At block 311, the application signature generator evaluates each cluster in the current set of clusters of weighted packet features against application tokens for the desired application and discards clusters below a threshold proximity score. This evaluation score can be based on a comparison of centers for each cluster with a set of labels associated with the target application. The application signature generator uses the application label database to compute a proximity score to measure similarity between token vectors corresponding to the cluster centers and the set of key labels (i.e., tokens) using an index of feature vectors to tokens as described with reference to FIG. 2. Clusters with a proximity score below the threshold proximity score are discarded. The threshold proximity score can be determined prior to the operations in FIG. 3. In some embodiments, when the re-clustering and evaluation operations in blocks 307, 311, and 313 result in the same cluster set over multiple iterations, the threshold proximity score can be incrementally increased to filter out clusters or, alternatively, a cluster with a highest proximity score can be chosen and operations proceed to block 315. Embodiments can use other techniques to iteratively reduce or narrow down the candidate clusters. For instance, the application signature generator can discard or eliminate the n least similar clusters in each iteration until the remaining clusters are above a desired threshold proximity score. The elimination variable can also be dynamic, for example decreasing in size as the number of candidate clusters shrinks.

At block 313, the application signature generator re-clusters the remaining clusters not filtered at block 311 with weighted packet features using the unsupervised learning model. The re-clustering operations can occur as described with reference to FIG. 2.

At block 314, the application signature generator determines if a re-clustering termination criterion is satisfied. The re-clustering termination criterion can be that the remaining clusters are all above a threshold proximity score. Alternatively, the criterion can be a threshold number of clusters, a number of re-clustering iterations, etc. The criterion can be dynamically updated based on any of the related parameters including number of re-clustering iterations, current number of clusters and proximity scores. If the re-clustering termination criterion is satisfied, operations continue to block 315. Otherwise, operations return to block 307.

At block 315, when it is determined that the re-clustering criterion is satisfied at block 314, the application signature generator returns an "application feature stream" for the remaining cluster(s) of weighted packet features corresponding to the target application. In some embodiments, a single cluster or multiple clusters can remain after the loop of operations at blocks 311, and 313. This "application feature stream" is not a stream of packets being transmitted between endpoints, but collection of packet tokens and contextual information (e.g., header field, header type, etc.) corresponding to captured packets deemed as representative of an application's network behavior. The application feature stream may organize the aggregation of packet tokens and contextual information according to packet boundaries and ordering of the corresponding packets. The ordering is not necessarily a strict correspondence based on timestamps but correspondence sufficient to express a message sequence or message exchange that represents network behavior of the application. These clusters can be received by an application signature generator for dynamic application signature generation.

At block 317, the application signature generator generates a dynamic application signature based on the application feature stream returned at block 315. The application signature generator analyzes the application feature stream for a pattern of tokens and context (token-context pattern). The application signature generator determines whether the tokens and corresponding context occur and/or repeat in an order. The application signature generator then creates program code to determine whether the token-context pattern appears in monitored network traffic. For example, the application signature generator creates markup language program code that indicates the pattern for comparison against a stream of monitored network traffic. Each pattern indicates a high likelihood of the data packet(s) corresponding to the application. The application signature can be generated as described above with reference to FIG. 2. If the application signature generator has already created a dynamic application signature for the target application based on an already processed session, then the pattern discovered from the current session can be added to the dynamic application signature as an alternative pattern that represents application network behavior.

At block 318, the application signature generator determines whether there is captured network traffic of another session to process. If there is another session, flow returns to block 304 for selection of the next session. If there is not another session to process, then flow continues to block 319.

At block 319, the application firewall determines whether there is an additional target application for profiling. If an additional target application is identified, operations return to block 301. Otherwise, the operations in FIG. 3 are complete.

Figure 4:
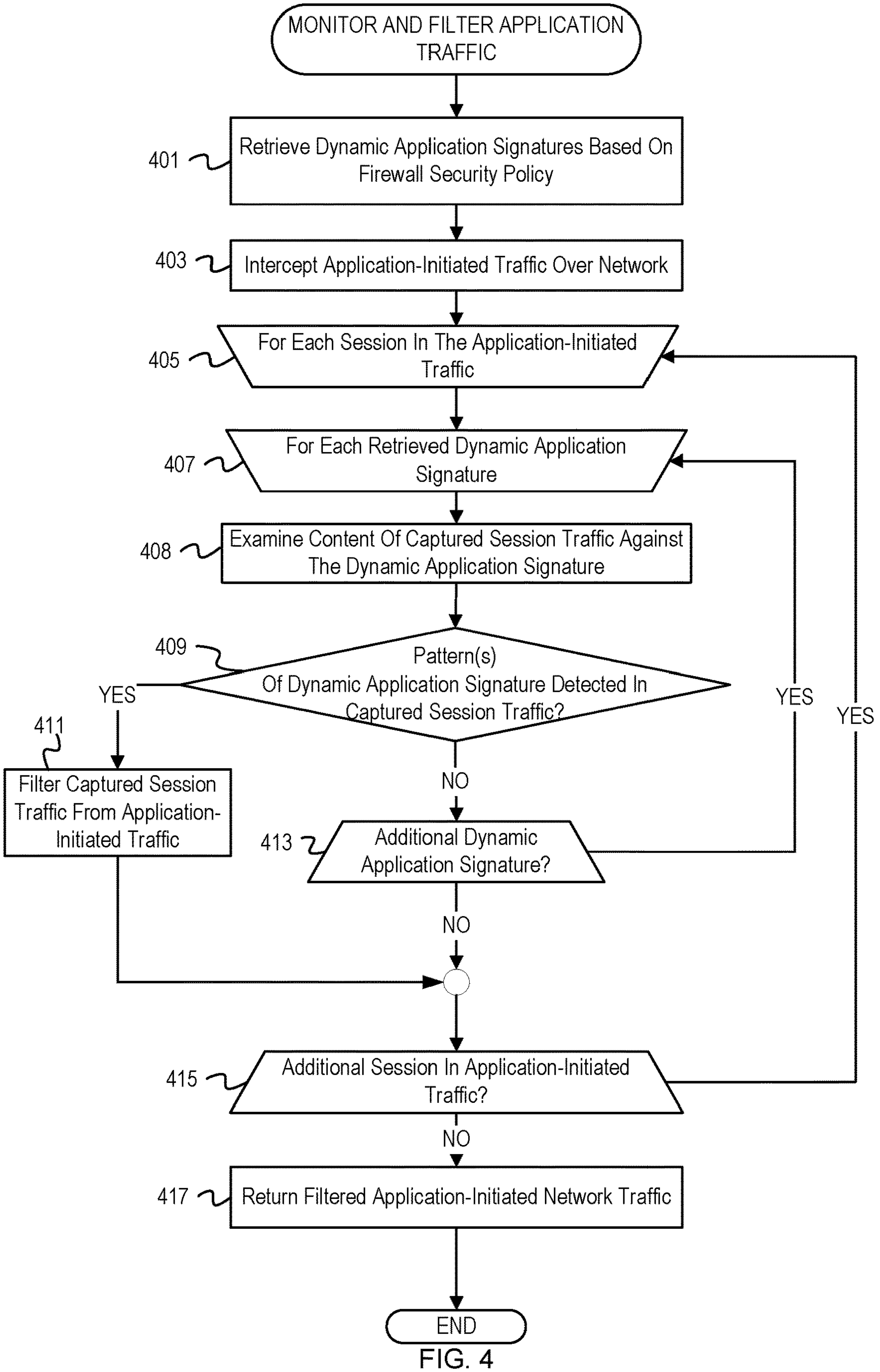
FIG. 4 is a flowchart of example operations for monitoring and filtering application traffic.

FIG. 4 is a flowchart of example operations for monitoring and filtering application traffic. The example operations are described with reference to an application firewall for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 401, the application firewall retrieves dynamic application signatures based on a firewall security policy. The firewall security policy can comprise a list of blocked applications and can be generated by a user or be a global firewall policy across a large network of computers. The policy can be based on known malicious applications and can be continuously updated as malicious applications are identified by the application firewalls. The dynamic application signatures can be retrieved from an application signature database that can be updated continuously as the application firewall monitors and filters application traffic in real time.

At block 403, the application firewall intercepts application-initiated traffic over a network. The application firewall can selectively intercept a subset of all network traffic based on a sampling rate, suspected malicious nodes in the network, or other indicators of activity related to blocked applications (i.e. applications for which signatures are retrieved at block 401) present in the network traffic.

At block 405, the application firewall begins iterating over each session in the application-initiated traffic intercepted at block 403. Although depicted in an iterative loop, the operations at blocks 407, 409, 411, and 413 can be performed in parallel across data packets as data packets are received by the application firewall.

At block 407, the application firewall begins iterating over dynamic application signatures retrieved at block 401. An application may have multiple dynamic application signatures. For instance, different dynamic application signatures may have been generated from different application sessions. Applications can have different types of transactions and sessions may be for different ones or sets of the transactions, resulting in the different dynamic application signatures. In addition to iterating over the signatures per target application, the application firewall may also iterate over multiple signatures corresponding to a single application. Embodiments may have pattern matching code running parallel to compare captured network traffic of a session against multiple signatures.

At block 408, the application firewall examines content of the captured traffic of the session against the current dynamic application signature. If the application firewall detects the pattern(s) expressed by the dynamic application signature in the captured traffic, then the application firewall identifies the application corresponding to the captured traffic as the target application corresponding to the signature. The application firewall can detect the signature in a single packet or across packets of the session. The application firewall may insert captured packets of a session into a queue (e.g., first-in-first-out (FIFO) queue. The size of the FIFO queue or any other structure designed to store captured packets can be set to a number sufficient for a pattern detection. After a specified number of packets are inserted into the queue (which can be 1), the application firewall can begin examining the captured packets against signature and repeat this examination as more packets are inserted and as packets start to be dequeued. The examining can be a search across the captured traffic for a pattern(s) or can involve deriving feature vectors from the captured session traffic and searching the feature vectors for the pattern(s). For example, the application signature can be xml code that the application firewall executes or interprets to examine captured session traffic and determine whether a pattern(s) indicated by the signature is detected. Based on this xml code, the application firewall (or an associated program code) can perform a substring search for a plurality of substrings in the captured session traffic.

Based on the examination, the application firewall determines whether the pattern(s) expressed by the dynamic application signature is detected in the captured session traffic at block 409. If the pattern(s) expressed by the dynamic application signature is detected in the captured session traffic, operations continue to block 411. Otherwise, operations skip to block 413.

At block 411, the application firewall filters the captured session traffic from application-initiated traffic (i.e., removes it from the intercepted application-initiated traffic). In some embodiments, the application firewall can store the filtered session traffic in a database for future signature generation and/or unit testing. Once operations at block 411 are complete, operations skip the loop of operations at blocks 407, 409, and 413 and proceed to block 415.

At block 413, the application firewall determines if an additional dynamic application signature is present from the set of retrieved intelligent application signatures. If an additional dynamic application signature is present, operations return to block 407. Otherwise, operations proceed to block 415.

At block 415, the application firewall determines if an additional session is present in the intercepted application-initiated data. If an additional session is present, operations return to block 405. Otherwise, operations proceed to block 417.

At block 417, the application firewall returns filtered application-initiated network traffic to the network. In some embodiments, once the application firewall identifies and filters session traffic at blocks 409 and 411, the application firewall can more closely monitor data packets from similar sources (e.g., from a same device on the network, from the same TCP session, etc.).

Variations

The above example illustrations refer to token vectors and token weight vectors. Embodiments are not limited to creating these two separate data structures for each captured protocol data unit. For example, an embodiment can create a "tokenized packet" structure organized to include the tokens of significance and associated weights. The unsupervised learning model can be programmed to access the dimension of the tokenized packet structure for the weights when clustering and then access the dimension of the structure for the tokens when comparing to target application tokens for similarity.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 303, 305, 307, 311, 313, 314, 315, and 317 can be performed in parallel or concurrently. With respect to FIG. 4, iterating over every retrieved dynamic application signature is not necessary for every data packet. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 5:
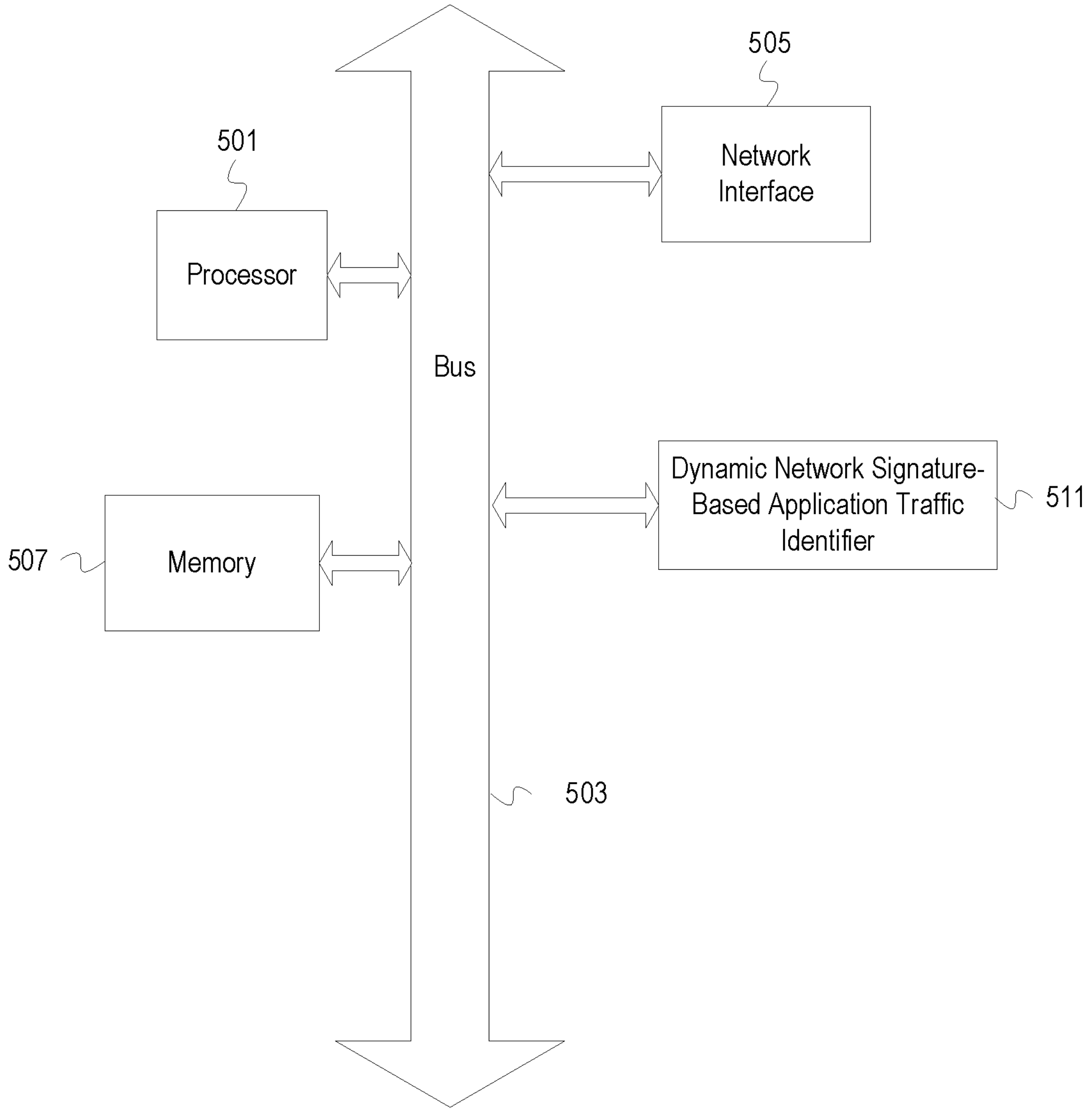
FIG. 5 depicts an example computer system with a dynamic network signature-based application traffic identifier.

FIG. 5 depicts an example computer system with a dynamic network signature-based based application traffic identifier. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes a dynamic network signature-based application traffic identifier 511. The dynamic network signature-based application traffic identifier 511 monitors and intercepts network traffic to generate network signatures from traffic of active sessions of target applications (e.g., applications to block from a network). Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for identifying application traffic streams over a network as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. A method comprising:

clustering a first plurality of token weight vectors to generate a first plurality of clusters of token weight vectors, wherein the first plurality of token weight vectors were generated based, at least in part, on a first plurality of token vectors generated from captured network traffic of a session;

refining the first plurality of clusters to a refined set of one or more clusters, wherein refining the first plurality of clusters comprises, determining, for each cluster remaining in an iteration, a proximity score based, at least in part, on similarity of the token vectors that correspond to centers of the cluster, wherein the proximity scores indicate similarity of token vectors in the first plurality of token vectors corresponding to centers of respective clusters to a set of one or more application tokens for a target application in the iteration, discarding n of the remaining clusters with the n lowest proximity scores; and re-clustering token weight vectors in clusters that remain, until a termination criterion is satisfied; and generating a network-level application signature for the target application based, at least in part, on those of the first plurality of token vectors that correspond to the refined set of one or more clusters of the token weight vectors remaining after the termination criterion is satisfied.

2. The method of claim 1, further comprising filtering monitored network traffic based, at least in part, on the network-level application signature of the target application.

3. The method of claim 1, wherein the first plurality of token weight vectors is determined based on a term frequency inverse document frequency statistic for token vectors in the first plurality of token vectors.

4. The method of claim 1, wherein generating the network-level application signature for the target application based, at least in part, on those of the first plurality of token vectors that correspond to the refined set of one or more clusters of token weight vectors comprises determining context information for one or more tokens indicated in those of the first plurality of token vectors that correspond to the refined set of one or more clusters of token weight vectors and generating program code that describes a pattern formed by the one or more tokens across packets of the captured network traffic according to the context information.

5. The method of claim 1, further comprising generating the first plurality of token weight vectors based, at least in part, on the first plurality of token vectors, wherein each of the first plurality of token weight vectors comprises a token weight for each token in the corresponding one of the first plurality of token vectors.

6. The method of claim 1 further comprising:

clustering a second plurality of token weight vectors to generate a second plurality of clusters of token weight vectors, wherein the second plurality of token weight vectors were generated based, at least in part, on a second plurality of token vectors generated from captured network traffic of a second session;

refining the second plurality of clusters to a second refined set of one or more clusters, wherein refining the second plurality of clusters comprises, determining, for each cluster remaining in an iteration, a proximity score based, at least in part, on similarity of the token vectors that correspond to centers of the cluster, wherein the proximity scores indicate similarity of token vectors in the second plurality of token vectors corresponding to centers of respective clusters to the set of one or more application tokens for the target application;

in the iteration, discarding n of the remaining clusters with the n lowest proximity scores; and re-clustering the remaining ones of the token weight vectors, until the termination criterion is satisfied; and generating a second network-level application signature for the target application based, at least in part, on those of the second plurality of token vectors that correspond to the second refined set of one or more clusters of the token weight vectors remaining after the termination criterion is satisfied.

7. The method of claim 6, further comprising tokenizing packets of the captured network traffic to generate the second plurality of token vectors.

8. A non-transitory, machine-readable medium having instructions stored thereon that are executable by a computing device to perform operations comprising:

generating a first plurality of tokenized packets from network traffic, wherein each tokenized packet comprises one or more tokens that identify an application or describe a packet attribute;

associating weights with the tokens;

creating a first plurality of tokenized packet clusters based, at least in part, on the associated weights;

refining the first plurality of clusters to a refined set of one or more clusters, wherein refining the first plurality of clusters comprises, determining, for each cluster remaining in an iteration, a proximity score based, at least in part, on similarity of the tokenized packets that correspond to centers of the cluster, wherein the proximity scores indicate similarity of tokens of the tokenized packets corresponding to centers of respective clusters to a set of one or more application tokens for a target application;

in the iteration, discarding n of the remaining clusters with the n lowest proximity scores; and re-clustering the remaining tokenized packets, until a termination criterion is satisfied; and generating program code that indicates a pattern of the tokens in those of the first plurality of tokenized packets that correspond to a refined set of one or more clusters of the token weight vectors remaining after the termination criterion is satisfied, wherein the pattern represents network behavior of the target application.

9. The machine-readable medium of claim 8, further comprising instructions that are executable by the computing device to perform operations comprising:

determining context information for each token extracted from a packet from the network traffic, wherein the instructions for generating the program code that indicates the pattern comprise instructions for indicating the context information corresponding to each token in the tokenized packets corresponding to the refined set of one or more clusters of the token weight vectors.

10. The machine-readable medium of claim 8, wherein the instructions for associating weights with the tokens comprise instructions for determining a weight for each token based, at least in part, on a term frequency inverse document frequency statistic.

11. The machine-readable medium of claim 8, further comprising instructions executable by the computing device to perform operations comprising filtering monitored network traffic based, at least in part, on detecting the pattern across packets of an active session in the network traffic.

12. An apparatus comprising:

a processor; and a non-transitory computer-readable medium having program code stored thereon that is executable by the processor to cause the apparatus to, cluster a first plurality of token weight vectors to generate a first plurality of clusters of token weight vectors, wherein the first plurality of token weight vectors were generated based, at least in part, on a first plurality of token vectors generated from captured network traffic of a session;

refine the first plurality of clusters to a refined set of one or more clusters, wherein the program code to refine the first plurality of clusters comprises program code to, determine, for each cluster remaining in an iteration, a proximity score based, at least in part, on similarity of the token vectors that correspond to centers of the cluster, wherein the proximity scores indicate similarity of token vectors in the first plurality of token vectors corresponding to centers of respective clusters to a set of one or more application tokens for a target application;

in the iteration, discard n of the remaining clusters with the n lowest proximity scores; and re-cluster token weight vectors in clusters that remain, until a termination criterion is satisfied; and generate a network-level application signature for the target application based, at least in part, on those of the first plurality of token vectors that correspond to the refined set of one or more clusters of the token weight vectors remaining after the termination criterion is satisfied.

13. The apparatus of claim 12, wherein the computer-readable medium further comprises program code executable by the processor to cause the apparatus to filter network traffic based, at least in part, on the network-level application signature of the target application.

14. The apparatus of claim 12, wherein the token weight vectors are determined based on a term frequency inverse document frequency statistic for token vectors in the first plurality of token vectors.

15. The apparatus of claim 12, wherein the program code to generate the network-level application signature for the target application based, at least in part, on those of the first plurality of token vectors that correspond to the refined set of one or more clusters of the token weight vectors comprises program code to determine context information for a plurality of tokens indicated in those of the first plurality of token vectors that correspond to the refined set of one or more clusters of the token weight vectors and generate second program code that describes a pattern formed by the plurality of tokens across packets of the captured network traffic according to the context information.

16. A method comprising:

clustering a first plurality of token weight vectors to generate a first plurality of clusters of token weight vectors, wherein the first plurality of token weight vectors were generated based, at least in part, on a first plurality of token vectors generated from captured network traffic of a session;

refining the first plurality of clusters to a refined set of one or more clusters, wherein refining the first plurality of clusters comprises, determining, for each cluster remaining in an iteration, a proximity score based, at least in part, on similarity of the token vectors that correspond to centers of the cluster, wherein the proximity scores indicate similarity of token vectors in the first plurality of token vectors corresponding to centers of respective clusters to a set of one or more application tokens for a target application;

in the iteration, discarding those of the remaining clusters in the iteration with a proximity score below a proximity score threshold; and re-clustering token weight vectors in clusters that remain, until a termination criterion is satisfied; and generating a network-level application signature for the target application based, at least in part, on those of the first plurality of token vectors that correspond to the refined set of one or more clusters of the token weight vectors remaining after the termination criterion is satisfied.

17. The method of claim 16, further comprising filtering monitored network traffic based, at least in part, on the network-level application signature of the target application.

18. The method of claim 16, wherein generating the network-level application signature for the target application based, at least in part, on those of the first plurality of token vectors that correspond to the refined set of one or more clusters of token weight vectors comprises determining context information for one or more tokens indicated in those of the first plurality of token vectors that correspond to the refined set of one or more clusters of token weight vectors and generating program code that describes a pattern formed by the one or more tokens across packets of the captured network traffic according to the context information.

19. The method of claim 16, wherein the termination criterion comprises a determination that each cluster remaining at a second iteration has a proximity score above the proximity score threshold.

20. A non-transitory, machine-readable medium having instructions stored thereon that are executable by a computing device to perform operations comprising:

generating a first plurality of tokenized packets from network traffic, wherein each tokenized packet comprises one or more tokens that identify an application or describe a packet attribute;

associating weights with the tokens;

creating a first plurality of tokenized packet clusters based, at least in part, on the associated weights;

refining the first plurality of clusters to a refined set of one or more clusters, wherein refining the first plurality of clusters comprises, determining, for each cluster remaining in an iteration, a proximity score based, at least in part, on similarity of the tokenized packets that correspond to centers of the cluster, wherein the proximity scores indicate similarity of tokens of the tokenized packets corresponding to centers of respective clusters to a set of one or more application tokens for a target application;

in the iteration, discarding those of the remaining clusters in the iteration with a proximity score below a proximity score threshold; and re-clustering the remaining tokenized packets, until a termination criterion is satisfied; and generating program code that indicates a pattern of the tokens in those of the first plurality of tokenized packets that correspond to a refined set of one or more clusters of the token weight vectors remaining after the termination criterion is satisfied, wherein the pattern represents network behavior of the target application.

21. The machine-readable medium of claim 20, further comprising instructions executable by the computing device to perform operations comprising filtering monitored network traffic based, at least in part, on detecting the pattern across packets of an active session in the network traffic.

22. The machine-readable medium of claim 20, further comprising instructions that are executable by the computing device to perform operations comprising:

determining context information for each token extracted from a packet from the network traffic, wherein the instructions for generating the program code that indicates the pattern comprise instructions for indicating the context information corresponding to each token in the tokenized packets corresponding to the refined set of one or more clusters of the token weight vectors.

23. The machine-readable medium of claim 20, wherein the termination criterion comprises a determination that each cluster remaining at a second iteration has a proximity score above the proximity score threshold.

24. An apparatus comprising:

a processor; and a non-transitory computer-readable medium having program code stored thereon that is executable by the processor to cause the apparatus to, cluster a first plurality of token weight vectors to generate a first plurality of clusters of token weight vectors, wherein the first plurality of token weight vectors were generated based, at least in part, on a first plurality of token vectors generated from captured network traffic of a session;

refine the first plurality of clusters to a refined set of one or more clusters, wherein the program code to refine the first plurality of clusters comprises program code to, determine, for each cluster remaining in an iteration, a proximity score based, at least in part, on similarity of the token vectors that correspond to centers of the cluster, wherein the proximity scores indicate similarity of token vectors in the first plurality of token vectors corresponding to centers of respective clusters to a set of one or more application tokens for a target application;

in the iteration, discard those of the remaining clusters in the iteration with a proximity score below a proximity score threshold;

and re-cluster token weight vectors in clusters that remain, until a termination criterion is satisfied; and generate a network-level application signature for the target application based, at least in part, on those of the first plurality of token vectors that correspond to the refined set of one or more clusters of the token weight vectors remaining after the termination criterion is satisfied.

25. The apparatus of claim 24, wherein the computer-readable medium further comprises program code executable by the processor to cause the apparatus to filter network traffic based, at least in part, on the network-level application signature of the target application.

26. The apparatus of claim 24, wherein the program code to generate the network-level application signature for the target application based, at least in part, on those of the first plurality of token vectors that correspond to the refined set of one or more clusters of the token weight vectors comprises program code to determine context information for a plurality of tokens indicated in those of the first plurality of token vectors that correspond to the refined set of one or more clusters of the token weight vectors and generate second program code that describes a pattern formed by the plurality of tokens across packets of the captured network traffic according to the context information.

27. The apparatus of claim 24, wherein the termination criterion comprises a determination that each cluster remaining at a second iteration has a proximity score above the proximity score threshold.

* * * * *